US009103321B1

(12) United States Patent
Bardia

(10) Patent No.: US 9,103,321 B1
(45) Date of Patent: Aug. 11, 2015

(54) ON OR OFF GRID VERTICAL AXIS WIND TURBINE AND SELF CONTAINED RAPID DEPLOYMENT AUTONOMOUS BATTLEFIELD ROBOT RECHARGING AND FORWARD OPERATING BASE HORIZONTAL AXIS WIND TURBINE

(71) Applicant: Jaime MIguel Bardia, Greenwich, CT (US)

(72) Inventor: Jaime MIguel Bardia, Greenwich, CT (US)

( * ) Notice: Subject to any disclaimer, the term of this patent is extended or adjusted under 35 U.S.C. 154(b) by 23 days.

(21) Appl. No.: 14/025,204

(22) Filed: Sep. 12, 2013

Related U.S. Application Data

(60) Provisional application No. 61/700,820, filed on Sep. 13, 2012.

(51) Int. Cl.
  *F03D 9/00* (2006.01)
  *H02P 9/04* (2006.01)
  *F03D 7/00* (2006.01)

(52) U.S. Cl.
  CPC . *F03D 9/002* (2013.01); *F03D 7/00* (2013.01)

(58) Field of Classification Search
  USPC .................................................. 290/44, 55
  See application file for complete search history.

(56) References Cited

U.S. PATENT DOCUMENTS

| | | | | |
|---|---|---|---|---|
| 2,106,928 A * | 2/1938 | Lee | | 416/178 |
| 4,236,866 A * | 12/1980 | Zapata Martinez | | 415/4.4 |
| 4,293,274 A * | 10/1981 | Gilman | | 416/51 |
| 4,464,579 A * | 8/1984 | Schwarz | | 290/44 |
| 4,490,093 A * | 12/1984 | Chertok et al. | | 416/26 |
| 4,514,145 A * | 4/1985 | Wood | | 416/170 R |
| 4,575,311 A * | 3/1986 | Wood | | 416/170 R |
| 5,057,696 A * | 10/1991 | Thomas | | 290/44 |
| 5,332,925 A * | 7/1994 | Thomas | | 290/44 |
| 5,405,246 A * | 4/1995 | Goldberg | | 416/227 A |
| 5,570,859 A * | 11/1996 | Quandt | | 244/213 |
| 6,172,429 B1 * | 1/2001 | Russell | | 290/54 |
| 7,132,760 B2 * | 11/2006 | Becker | | 290/55 |
| 7,156,609 B2 * | 1/2007 | Palley | | 415/4.2 |
| 7,344,353 B2 * | 3/2008 | Naskali et al. | | 415/4.2 |
| 7,362,004 B2 * | 4/2008 | Becker | | 290/55 |
| 7,393,177 B2 * | 7/2008 | Rahai et al. | | 415/4.2 |
| 7,976,267 B2 * | 7/2011 | Burrell, IV | | 415/4.2 |
| 8,096,750 B2 * | 1/2012 | McEntee et al. | | 415/4.2 |
| 8,258,647 B2 * | 9/2012 | Haar | | 290/55 |
| 8,278,777 B2 * | 10/2012 | Buns | | 290/55 |
| 8,297,930 B2 * | 10/2012 | Bertony | | 416/176 |
| D671,070 S * | 11/2012 | Joutsiniemi | | D13/115 |
| 8,368,271 B2 * | 2/2013 | Wiggins | | 310/90.5 |
| 8,373,294 B2 * | 2/2013 | Haar | | 290/44 |
| 8,376,688 B2 * | 2/2013 | Haar | | 415/66 |
| 8,393,853 B2 * | 3/2013 | Sauer et al. | | 415/72 |
| 8,444,384 B2 * | 5/2013 | Pesetsky | | 416/23 |
| 8,487,470 B2 * | 7/2013 | Grassman | | 290/55 |
| 8,491,262 B2 * | 7/2013 | McGrath et al. | | 416/1 |

(Continued)

*Primary Examiner* — Pedro J Cuevas
(74) *Attorney, Agent, or Firm* — Hess Patent Law Firm LLC; Robert J. Hess

(57) ABSTRACT

Vertical axis wind turbine and horizontal wind turbine each with a rotary wing assembly that has helical swept wings whose free ends each have a spoiler. The vertical axis wind turbine has permanent magnet discs for levitating static weight of an entirety of the rotary wing assembly via magnetic repulsion. There is a hub or affixing the permanent magnet discs within a frame structure in a manner that counteracts both a coefficient of friction ("COF") associated with rotation of the rotary wing assembly and ensuing bearing wear imparted from the rotary wing assembly. The horizontal axis wind turbine has collapsible telescoping towers.

21 Claims, 20 Drawing Sheets

(56) References Cited

U.S. PATENT DOCUMENTS

| | | | |
|---|---|---|---|
| 8,647,063 B2* | 2/2014 | Koike | 416/88 |
| 8,672,633 B2* | 3/2014 | Ball | 416/197 A |
| 8,698,340 B2* | 4/2014 | Hu | 290/55 |
| 8,714,925 B2* | 5/2014 | Kamen et al. | 416/23 |
| 2004/0061337 A1* | 4/2004 | Becker | 290/44 |
| 2004/0265116 A1* | 12/2004 | Kaneda | 415/4.2 |
| 2005/0001433 A1* | 1/2005 | Seelin | 290/44 |
| 2006/0198724 A1* | 9/2006 | Bertony | 415/4.4 |
| 2006/0257240 A1* | 11/2006 | Naskali et al. | 415/4.4 |
| 2007/0018464 A1* | 1/2007 | Becker | 290/55 |
| 2007/0029807 A1* | 2/2007 | Kass | 290/55 |
| 2008/0227378 A1* | 9/2008 | Yokoi | 452/64 |
| 2008/0273974 A1* | 11/2008 | Becker | 416/7 |
| 2009/0081047 A1* | 3/2009 | Koike | 416/223 R |
| 2010/0295316 A1* | 11/2010 | Grassman | 290/55 |
| 2010/0296935 A1* | 11/2010 | Kamen et al. | 416/205 |
| 2011/0037271 A1* | 2/2011 | Sheinman | 290/55 |
| 2011/0049894 A1* | 3/2011 | Green | 290/52 |
| 2011/0081243 A1* | 4/2011 | Sullivan | 416/120 |
| 2011/0089700 A1* | 4/2011 | Tully | 290/55 |
| 2011/0115232 A1* | 5/2011 | vanderdeen | 290/55 |
| 2011/0116930 A1* | 5/2011 | Ball | 416/197 A |
| 2011/0156400 A1* | 6/2011 | Lowe | 290/55 |
| 2012/0128500 A1* | 5/2012 | Perless et al. | 416/223 R |
| 2012/0134803 A1* | 5/2012 | McGrath et al. | 416/1 |
| 2012/0134814 A1* | 5/2012 | McGrath et al. | 416/23 |
| 2012/0141268 A1* | 6/2012 | Pesetsky | 416/1 |
| 2012/0146338 A1* | 6/2012 | Teglia | 290/55 |
| 2012/0313291 A1* | 12/2012 | Stege | 264/259 |
| 2013/0078092 A1* | 3/2013 | Chen et al. | 416/1 |
| 2013/0313054 A1* | 11/2013 | Polito et al. | 188/78 |
| 2014/0147280 A1* | 5/2014 | Kowatsch | 416/169 R |
| 2014/0152201 A1* | 6/2014 | Shriver et al. | 318/376 |

* cited by examiner

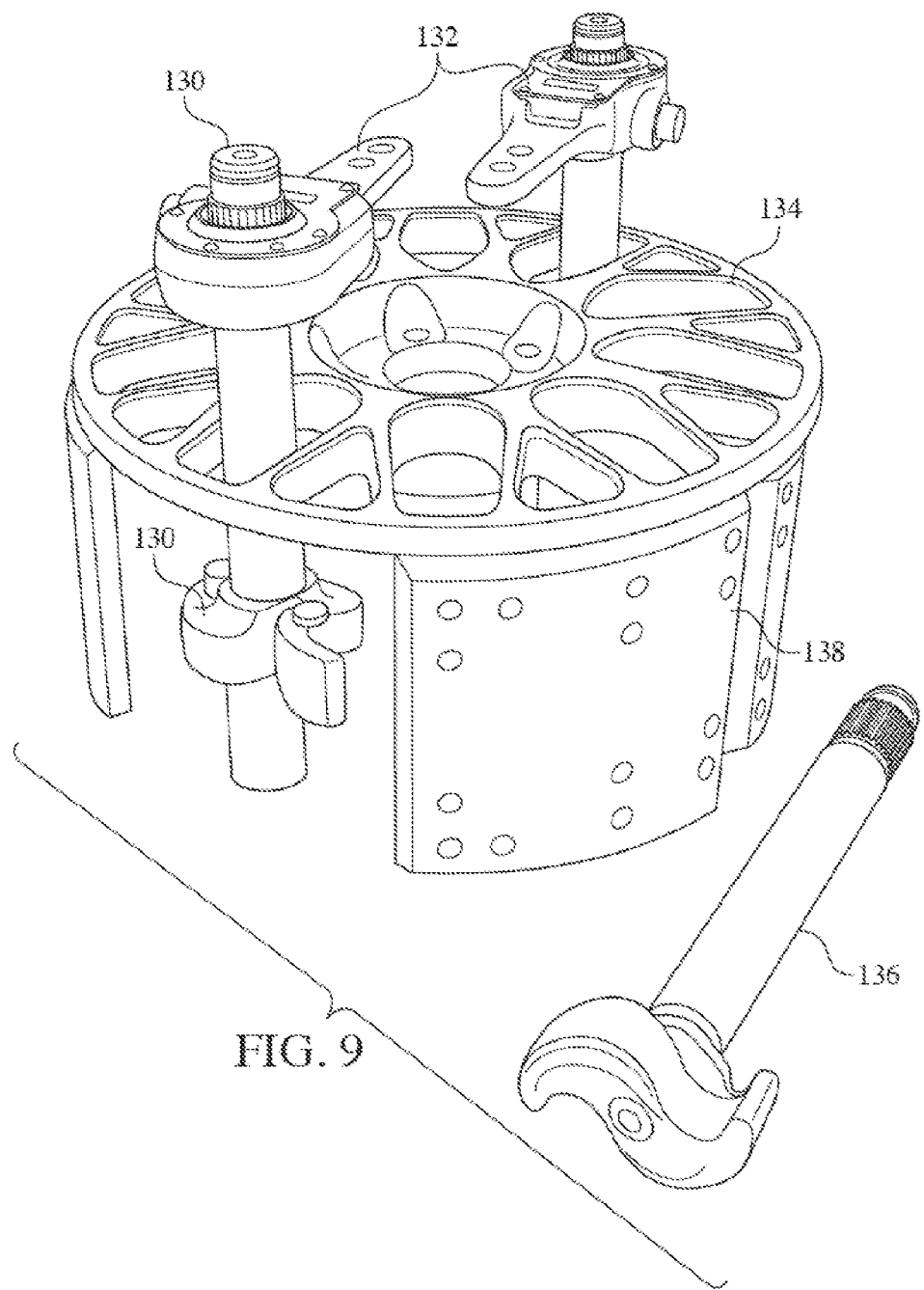

ON OR OFF GRID VERTICAL AXIS WIND TURBINE AND SELF CONTAINED RAPID DEPLOYMENT AUTONOMOUS BATTLEFIELD ROBOT RECHARGING AND FORWARD OPERATING BASE HORIZONTAL AXIS WIND TURBINE

CROSS-REFERENCE TO COPENDING PATENT APPLICATIONS

The present application is accorded the benefit of priority from provisional patent application Ser. No. 61/700,820 filed Sep. 13, 2012.

BACKGROUND OF THE INVENTION

1. Field of the Invention

The present invention relates to an off or on grid wind turbine for capturing and maximizing dissimilar airflow(s) (laminar and turbulent) through a series of magnetically levitated helical variable geometry asymmetrical wings. The wings multiply the resultant rotational force into kinetic energy, thereby creating the torque required to rotate a mechanical drive system composed of individually activate alternators. This creates 36 kW or more of onsite electricity.

The present invention also relates to a retractable wind turbine tower to supply renewable electricity. The tower is equipped with redundant generators, AC & DC distribution and electrical control systems, robot charging pads, hydraulic deployment and mechanical drive systems and deployable off road capable chassis.

2. Description of Related Art

The present inventor considers Vertical Axis Wind Turbines (VAWTs) to suffer from inherent performance disadvantages that result from physical stress limitation and variations in wind velocity. The common shortcoming of VAWTs is the need for guy wires, resistance to self-starting (that is, high coefficient of drag), high bearing loads, limited overspeed control and the lack of destructive vibration dampening. It is desired to overcome these inherent problems with VAWTs.

SUMMARY OF THE INVENTION

Various aspects of the present invention relate to a self-supporting structure without the need for guy wires, a magnetic repulsion levitated rotary wing hub, a relatively low friction bearing hub, helical swept wings, a centrifugal force deployed leading edge slat, a centrifugal force deployed trailing edge flap, a boundary layer fence for self-starting, a centrifugal force deployed boundary layer spoiler, a centrifugal runaway brake, a self ventilating centrifugal brake shoe backing plate, an ECM controlled 6 speed sequential transmission with a low pressure dry sump lubrication system and a separate ECM controlled high pressure hydraulic speed control with a failsafe centrifugal force deployed mechanical apparatus, an ECM input magnetically engaged conical dog clutch drive shaft engagement, an ECM input magnetic clutch generator engagement, multiple alternators, a linear/vertically stacked/progressive/switchable/alternators, ECM controlled mounts, an electronic control module, power takeoff, thermal control and a programmable 360 degree illuminated stationary sign on a variable speed rotary device.

Further aspects of the invention relate to the supply of renewable electricity to a forward battlefield operations base and a platform for autonomous robots to automatically recharge via permanently affixed charging pads. The supply of renewable electricity is from a wind turbine equipped with redundant generators, AC & DC distribution and electrical control systems, robot charging pads, hydraulic deployment and mechanical drive systems.

BRIEF DESCRIPTION OF THE DRAWING

For a better understanding of the present invention, reference is made to the following description and accompanying drawings, while the scope of the invention is set forth in the appended claims.

FIG. 9 is an isometric view of a ventilated backing plate complete with actuator S cams and centrifugal bob weights.

DESCRIPTION OF THE PREFERRED EMBODIMENT

Vertical Axis Wind Turbine

Figure 1A:
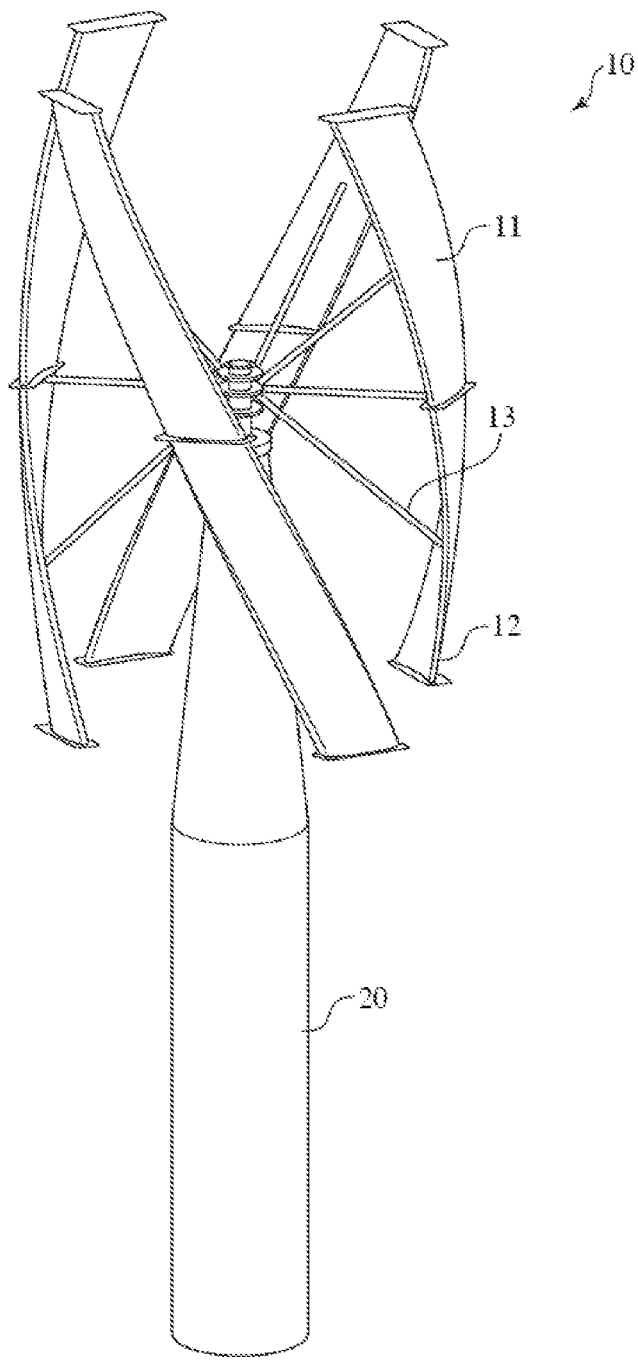
FIGS. 1A and 1B are isometric views of a vertical axis wind turbine in accordance with the invention.
Figure 1B:
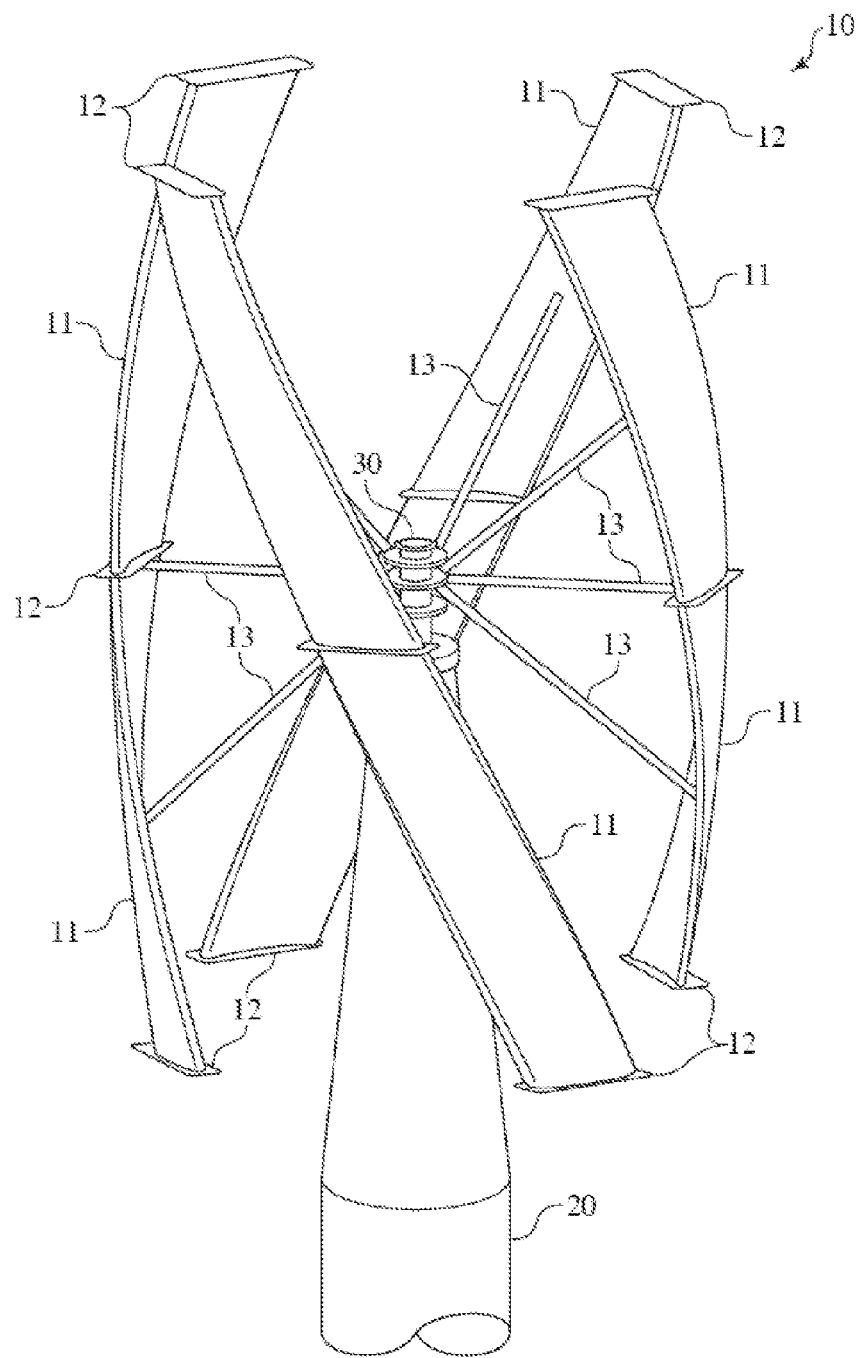

Turning to the drawings, FIGS. 1A, 1B, 2, 3A, 3B, 4A through 4D show structural components of a vertical axis wind turbine 10 (FIG. 1) in accordance with an embodiments of the invention. The components include helical swept wings 11 (FIGS. 1A and 1B) with a series of boundary fences 12 at their ends and toward the middle. A conical tower 20 tapers toward the top where it supports in a rotatable manner via a magnetic repulsion levitated rotary wing hub 30 rods 13 that connect to each of the helical swept wings 11.

Conical Tower Frame Assembly that Supports Components

Turning to FIGS. 3A through 4D, a self-standing structural frame 40 is within the conical tower 20 and includes an upper frame 42 and a lower frame 41. The upper frame 42 may be pyramidal or conical in its shape and lower frame 41 may be rectangular or cylindrical in its shape. While the lower frame 41 is initially empty (FIG. 4A), it will subsequently support various components that are placed within it confines.

Figure 4A:
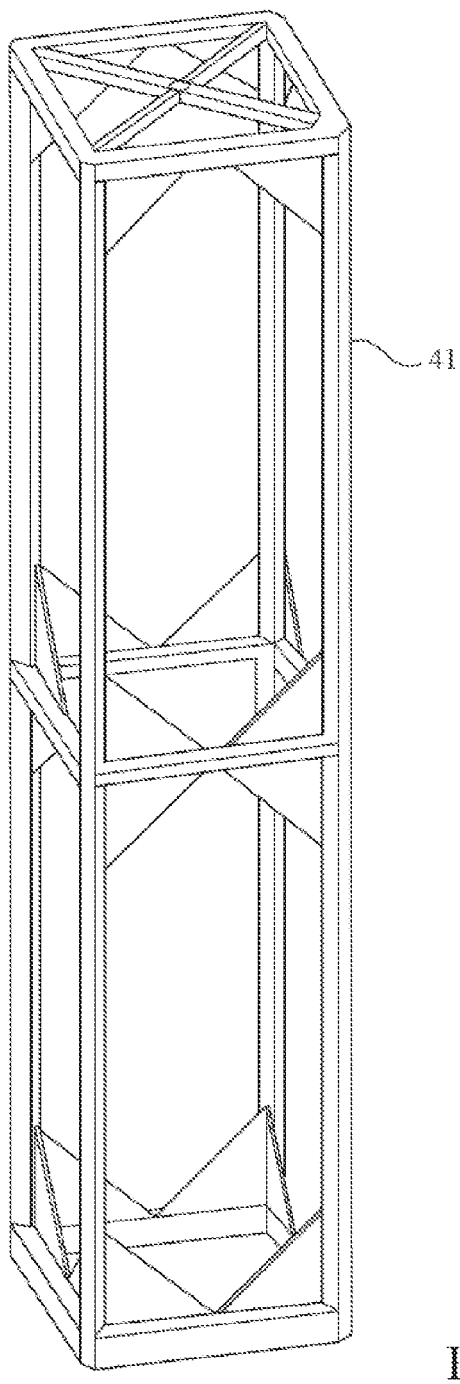
FIG. 4A is an isometric view of a lower frame of FIG. 3A that is empty.
Figure 4B:
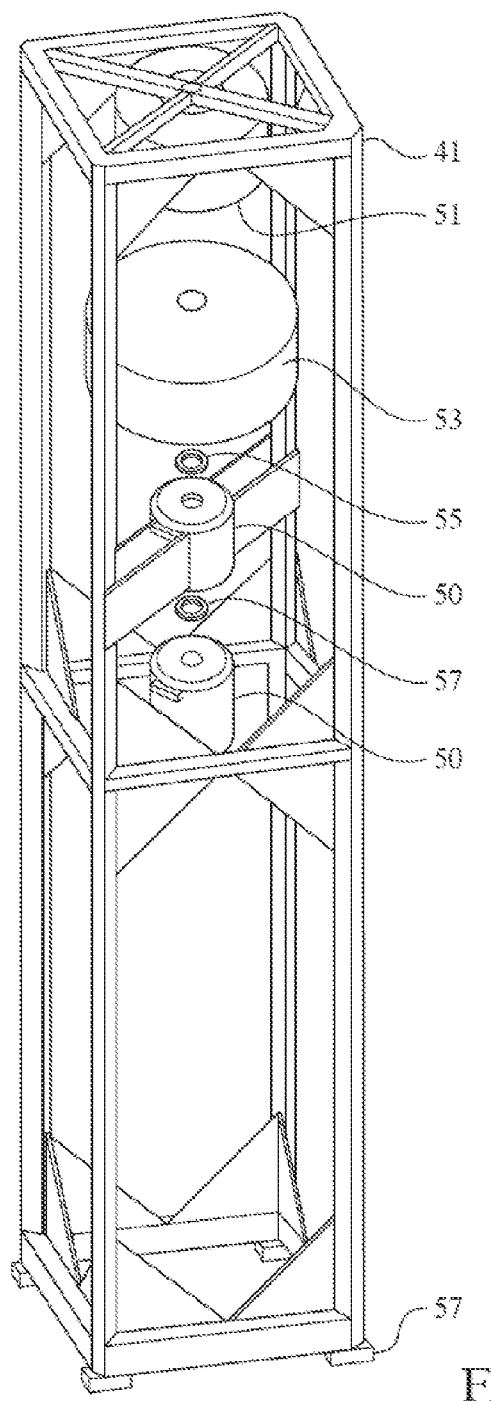
FIG. 4B is an isometric view of the lower frame of FIG. 4A but supporting components.

FIG. 4B depicts the lower frame 41 supporting a drum 51 containing a C-brake above the top of a transmission 53. Below the transmission 53 is shown a ring 55 denoting the location of an overdriven axial fan 132 (FIG. 4E) and beneath that an electromagnetic clutch. Alternators 50 or generators are stacked one above the other and beneath each is shown a further ring 57 that designates the location for another overdriven axial fan and beneath that another electromagnetic clutch. Both the overdriven axial fan 132 (FIG. 4E) and the electromagnetic clutch are conventional. Above the lower frame 41 is mounted a junction hub on which is mounted (via bolts) a radial fan 130 (FIG. 4E) for dispersing the airflow from the overdriven axial fans in a direction perpendicular to the direction of airflow from the overdriven axial fans. In the context of FIG. 4B, the overdriven axial fans 132 (FIG. 4E) blow air vertically through the alternators/generators to remove their heat and the radial fan 132 (FIG. 4E) receives the vertical airflow to turn the airflow to flow horizontally, i.e., essentially perpendicular from the direction before. The radial fan 132 is within the conical portion of the conical tower 20. The over driven axial fans are attached to the main shaft below each of the alternators 50 or generators.

There are four magnetorheological mounts 57 under the four lower corners of the frame 41. Each mount is rubber that has a cavity containing a magnetorheological fluid, which is conventional and is essential oil with iron filings that responds to the application of electrical signals from an electronic control module to isolate harmonics from affecting the mounting surfaces to which the mounts are mounted. Sensors are provided to send signals regarding vibrations and velocity to the electronic control module, which interprets those signals to determine the appropriate action to take to counter their passage through the magnetorheological mounts 57 by causing the magnetorheological fluid respond accordingly.

Figure 4C:
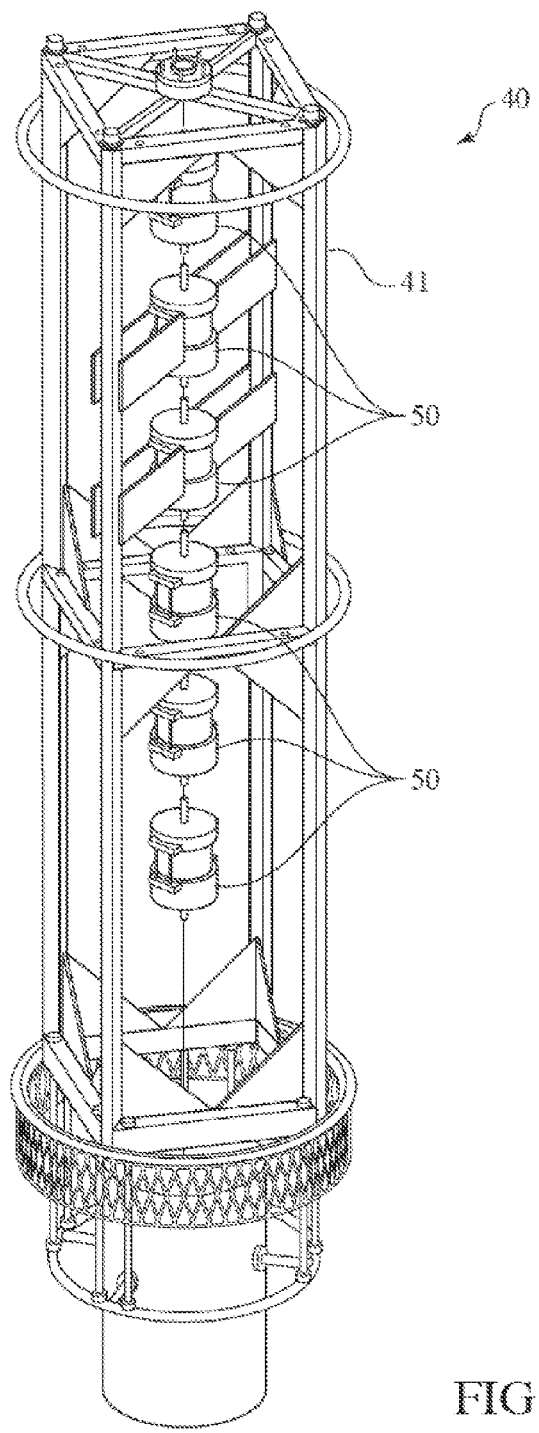
FIG. 4C is an isometric view of the lower frame of FIG. 4A with alternators stacked one over the other in position within the ground level assembly.
Figure 4D:
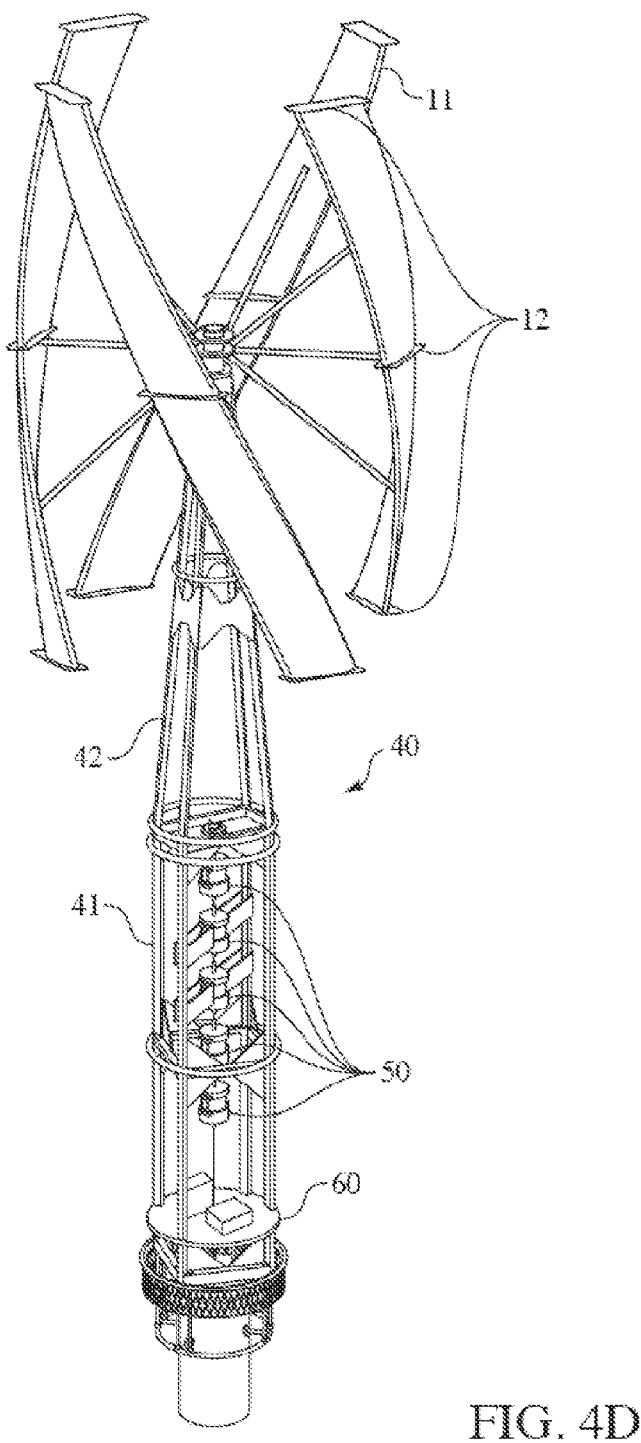
FIG. 4D is an isometric view of the self-standing frame of FIG. 3A that includes the lower frame of FIGS. 4A-4C that supports, at the top, the magnetic repulsion levitated rotary wing hub of FIG. 2, which is in turn supporting helical swept wings.
Figure 4E:
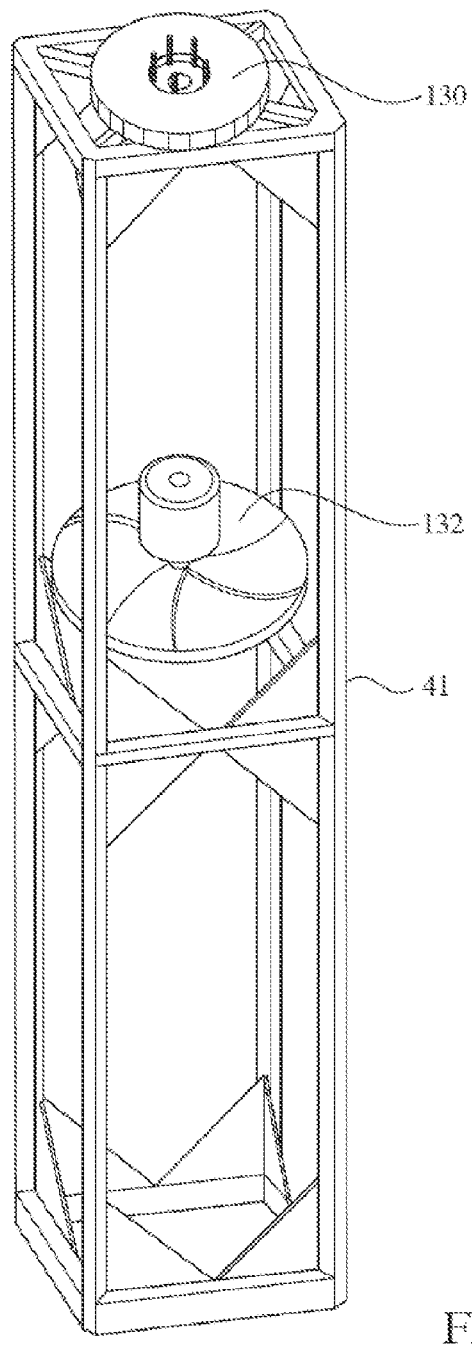
FIG. 4E is an isometric view of the lower frame of FIG. 4A supporting a radial fan and an axial fan.

The magnetic repulsion levitated rotary wing hub 30 (FIG. 2) is supported atop the upper frame 42 of the self-standing structural frame 40 (FIG. 3A), 45 (FIG. 3B) that is within the conical tower 20. Within the self-standing structural frame 40 are supported the alternators 50 or generators stacked one over the other and, at the base, an electronic control module 60 (FIG. 4C).

Figure 2:
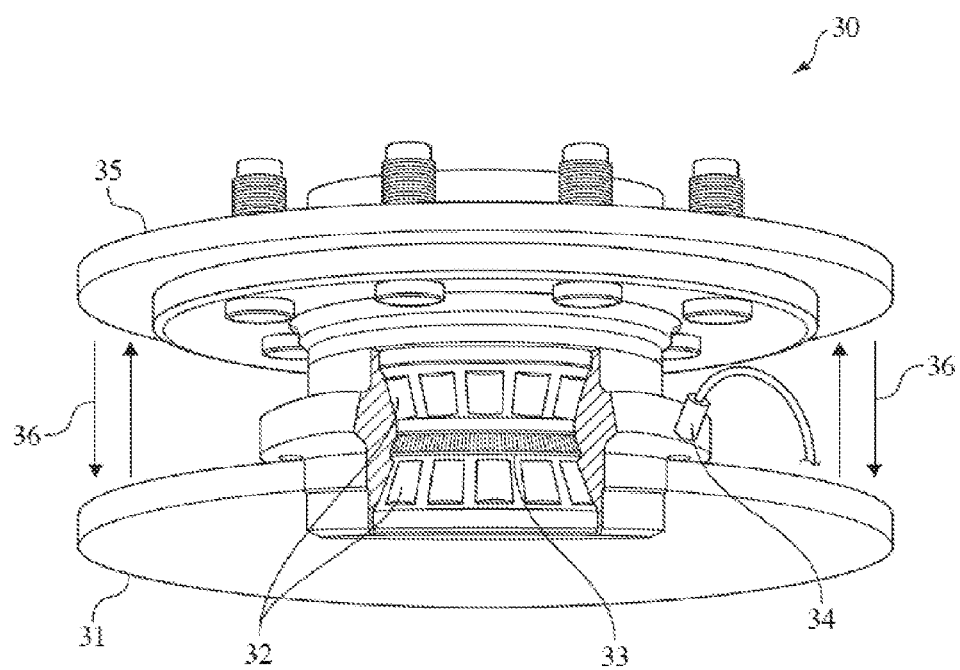
FIG. 2 is an isometric view of a magnetic repulsion levitated rotary wing hub.
Figure 3A:
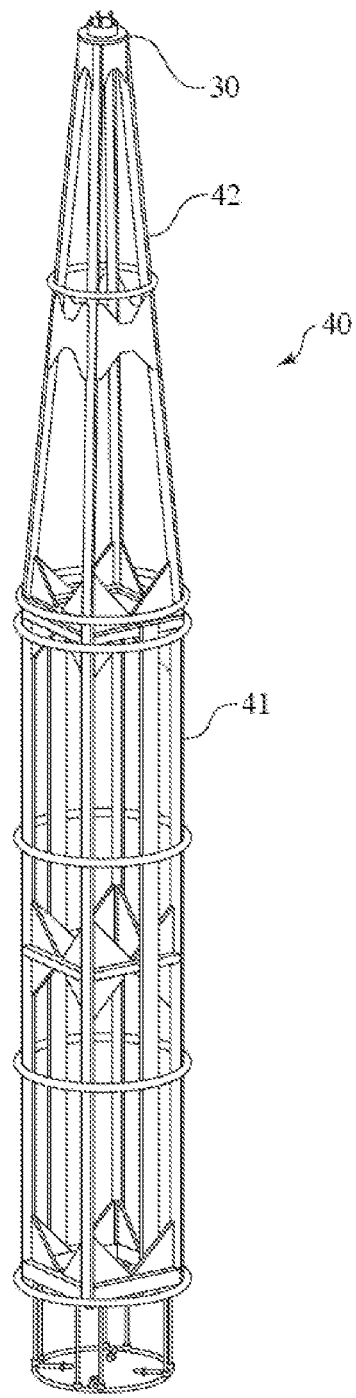
FIGS. 3A and 3B are isometric views of alternative self-standing frames of the vertical axis wind turbine of FIG. 1 that supports, at the top, the magnetic repulsion levitated rotary wing hub of FIG. 2.
Figure 3B:
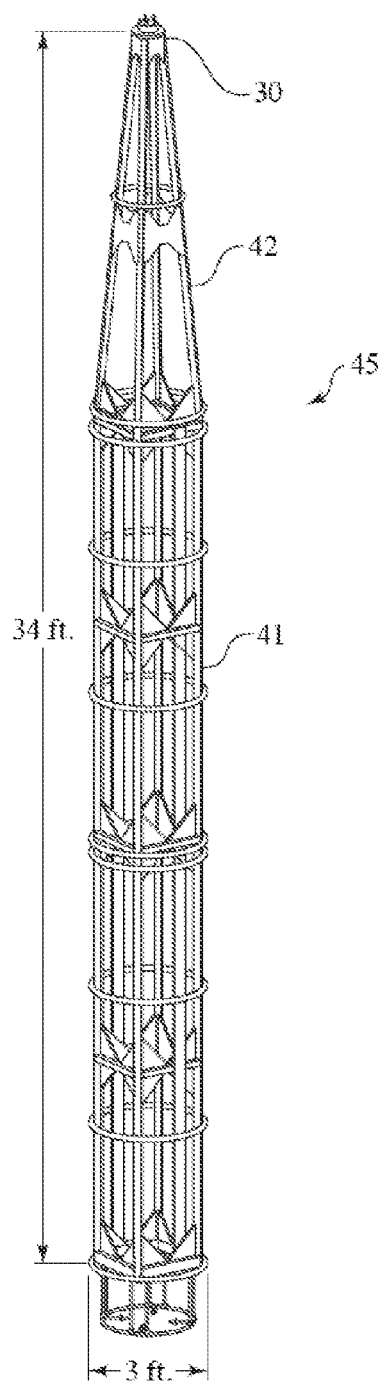

The magnetic repulsion levitated rotary wing hub 30 of FIG. 2 includes two rare earth ring magnets 31, 35 and two opposing conical bearings 32 separated from each other by a hall effect ring 33. A hall effect sensor 34 is provided to sense the magnetic field created by magnetic repulsion 36 between the two rare earth ring magnets and to measure current from which the velocity of the rotation of the helical swept wings can be determined by the electronic control module 60.

The Hall effect sensor 34 is conventional, being a transducer that varies its output voltage in response to a magnetic field. Hall effect sensors are used for proximity switching, positioning, speed detection, and current sensing applications. In its simplest form, the sensor operates as an analog transducer, directly returning a voltage. With a known magnetic field, its distance from the Hall plate can be determined. Using groups of sensors, the relative position of the magnet can be deduced. Electricity carried through a conductor will produce a magnetic field that varies with current, and a Hall sensor can be used to measure the current without interrupting the circuit. Typically, the sensor is integrated with a wound core or permanent magnet that surrounds the conductor to be measured.

Self-Supporting without Guy Wires

The self-supporting structural frame 40 (FIG. 3A), 45 (FIG. 3B) does not require guy wires to be self-supporting. The wind turbine 10 is supported via the self-supporting structural frame 40, 45 that serves as a skeletal frame that transfers the lateral torsion buckling load of the housing, conical tower 20, thrust of the rotary wing assembly (helical swept wings 11) and lateral wind loads in a steel reinforced concrete foundation (not shown in the drawings) into which is supported the bottom of the skeletal frame.

Self-Starting

The following components of the wind turbine assist in self-starting of the wind turbine. The components are:

(1) A rotary wing hub that is magnetic repulsion levitated (self-starting). A permanent magnet stand-off disc forms the base of the rotary wing hub that utilizes magnetic repulsion from an identically polarized (North and North polarity), stationary, permanent magnet stand-off disc. The disc is affixed to the conical tower in order to levitate the static weight of the entire rotary wing assembly. That is, the disc is affixed via a low friction bearing hub to counteract both the high coefficient of friction ("COF") associated with VAWTs and the ensuing bearing wear that results from rotary wing vertical stack loading commonly imparted on VAWTs.

(2) The magnetic repulsion levitated rotary wing hub 30 of FIG. 2 is a relatively low friction bearing hub (self-starting) to reduce the COF further and is integrated into the wind turbine. The relatively low friction bearing hub contains double opposing conical needle bearings 32 with a toothed ring (hall effect ring 33) and electronic inductive pickup (hall effect sensor 34) that serves as a velocity sensor.

(3) The helical swept wings 11 are comprised of four (4) to six (6) asymmetrical wings with a circumferential sweep of a dimension (such as 113.6 inches) to provide from a full width wing overlap enabling the capture of wind throughout the circumference from both the windward and leeward sides of the wings. As a result, the torque input spreads evenly, thereby mitigating damaging harmonic pulsations that would otherwise arise without the even torque input spread.

Figure 6:
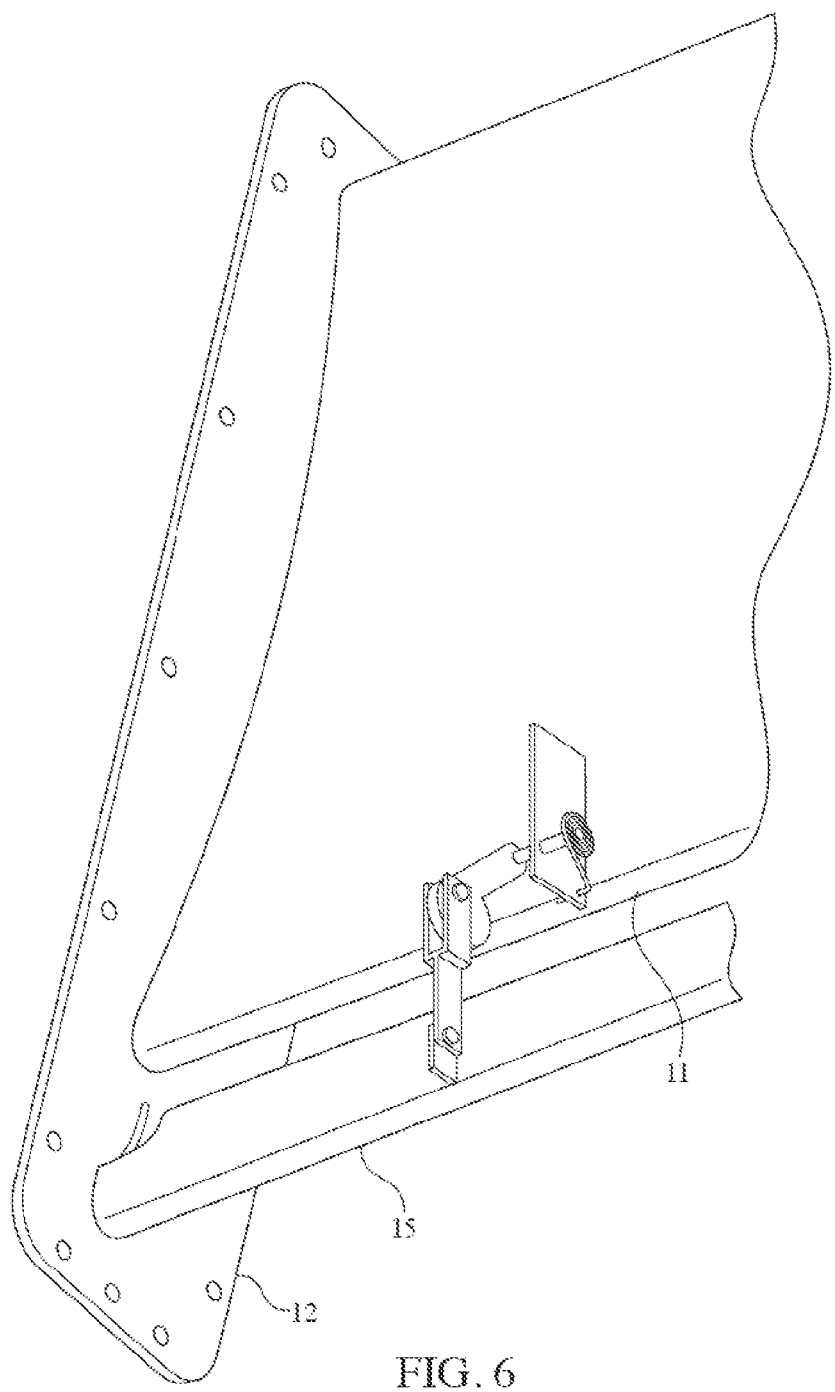
FIG. 6 is an isometric view of a free end of one of the helix swept wings of the vertical axis wind turbine of FIG. 1 with the spring pivot mechanism of FIG. 5.

(4) A centrifugal force deployed leading edge slat 15 (self-starting), is shown in FIG. 6 and is utilized by the rotary asymmetrical helical swept wings 11. The slat 15 is moved into a deployed position from a retracted position to increase the helical wing's camber and angle of attack beyond that for the leading edge slat in the retraced position. The leading edge slat deploys via a spring loaded extendable hinge mechanism while at rest and retracts at a pre-set rate as rotation induced centrifugal force is imparted on the rotating eccentric cams.

Figure 7A:
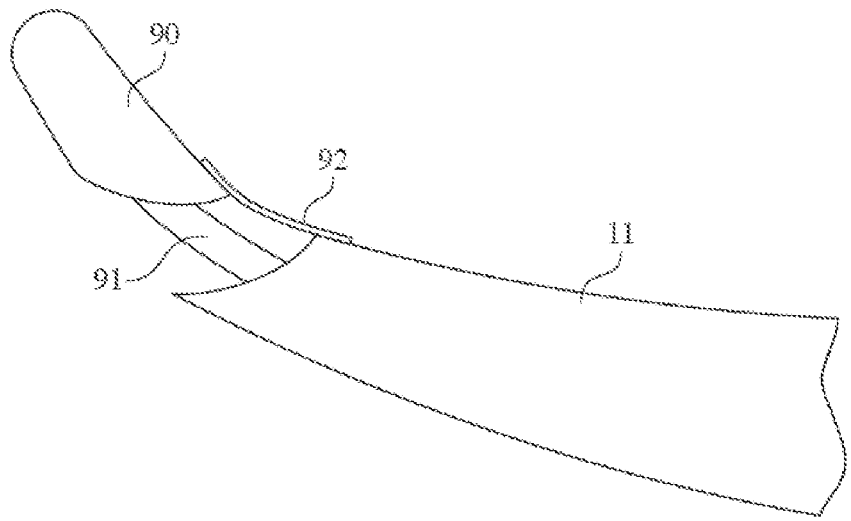
FIGS. 7A and 7B are isometric views of a free end of one of the helical swept wings of FIG. 4 and the leading edge slat in respective retracted and deployed positions and a spoiler in respective deployed and retracted positions.
Figure 7B:
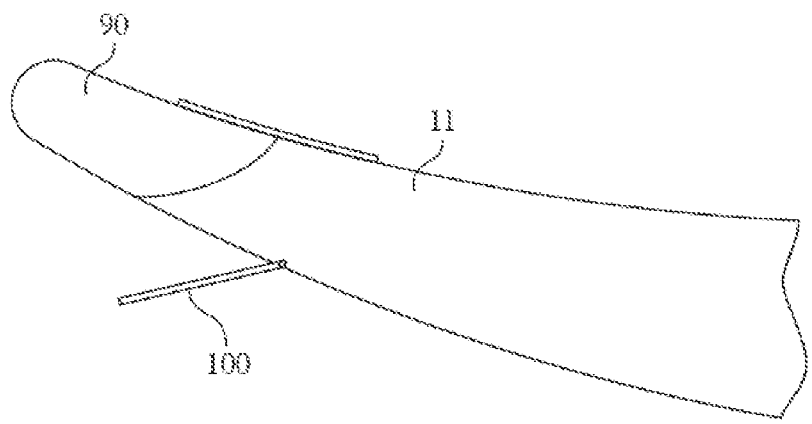

(5) A centrifugal force deployed trailing edge flap 90 (self-starting) of FIGS. 7A and 7B is utilized by the rotary asymmetrical helical swept wings 11. The flap is moved to increase the helical wing's camber, platform area and angle of attack beyond that for the flap being in the retracted position. The trailing edge flap deploys via a spring loaded extendable hinge mechanism while at rest and retracts at a pre-set rate as rotation induced centrifugal force is imparted on the rotating eccentric cams.

(6) At the top and bottom edge of each wing section, the rotary asymmetrical helical swept wings utilized a stationary boundary layer fence 12 (self-starting) of FIG. 6. The fence is affixed perpendicular to the rotational axis that act to obstruct span-wise airflow. The fence also reduces the noise arising from rotation of the helical swept wings by dispersing the sound waves by changing the direction of the airflow along the helical swept wings.

(7) An electric motor with a drive gear that is moved along its axis by a momentarily activated solenoid engages an externally geared flywheel upon sensing rotary wing motion. (self starting)

A Spring Loaded Extendable Hinge Mechanism

Figure 5:
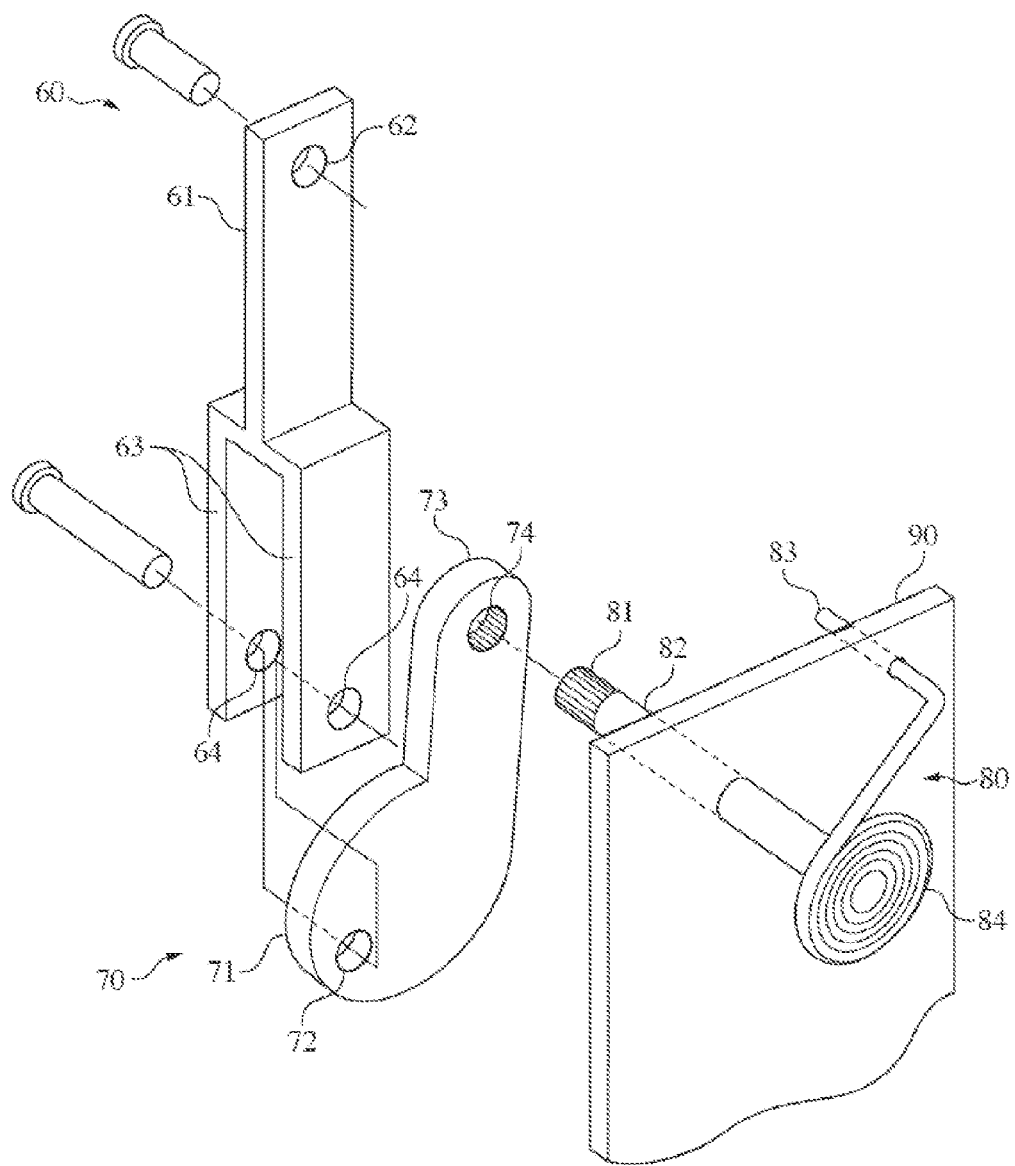
FIG. 5 is an exploded isometric view of spring pivot mechanism that may be used to move a leading edge slat a trailing edge flap and a helical swept wind spoiler between their respective retracted and deployed positions.

FIG. 5 shows the four components of a spring loaded extendable hinge mechanism that urges between deployed and retracted positions. The four components are a pronged fork actuation bracket 60, an eccentric cam 70, a spring loaded tension piece 80 and a support plate 90.

The pronged fork actuation bracket 60 includes a single tine 61 with a hole 62 and two prongs 63 each with a respective one of two aligned holes 64. The single tine 61 and the two prongs extend in opposite directions from a common central region. The two prongs are substantially the same length and are substantially parallel to each other.

The eccentric cam 70 has an oval portion 71 with a hole 72 and a rounded elongated portion 73 with a hole 74.

The spring loaded tension piece 80 includes a multi-parallel grooved end portion 81 at the end of a shaft 82 that in turn extends from a coiled spring 84 at its opposite end. The outer most coiled strand of the coiled spring 84 extends outward away from the rest of the coiled spring to bend and terminate into a tang 83.

Figure 8A:
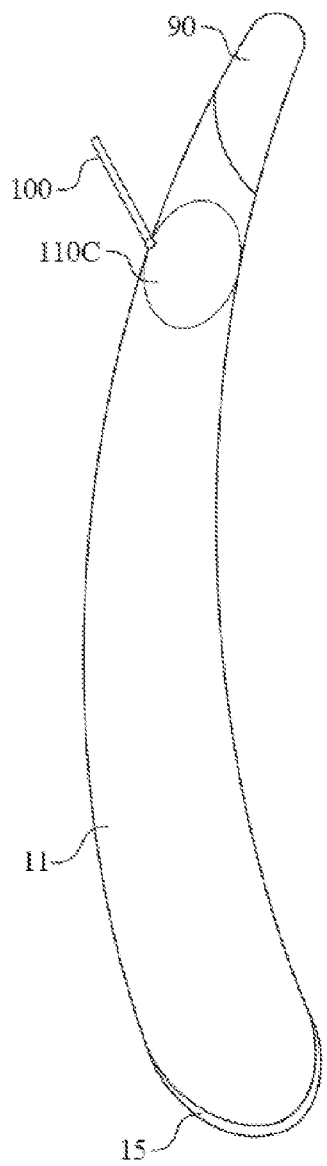
FIG. 8A and FIG. 8B are schematic views of the entire one of the helical swept wings of FIGS. 7A and 7A including the remaining free end of the one of the helical swept wings of FIGS. 7A and 7B and a trailing edge flap in respective retracted and deployed positions.
Figure 8B:
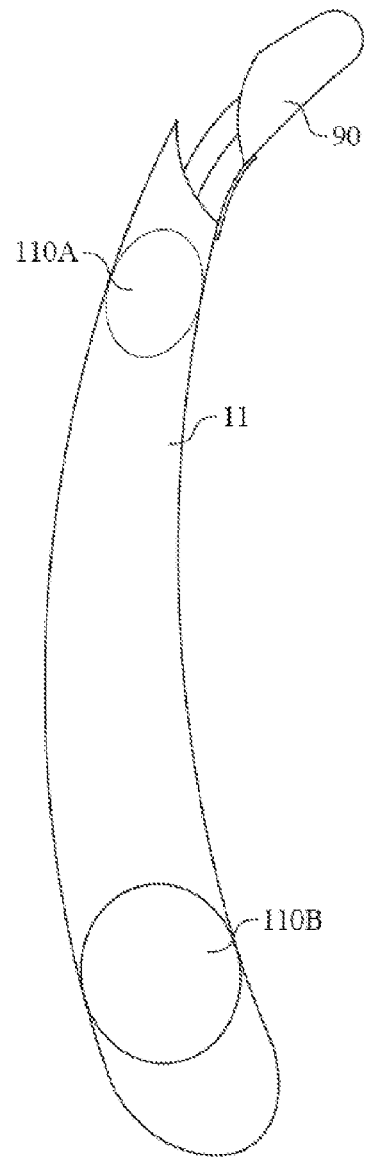

The support plate 90 has two holes spaced apart from each other approximately by the length of the outer most coiled strand of the coiled spring 84 and are dimensioned to accommodate insertion of the shaft 82 and the tang 83 respectively. The support plate 90 is secured to an appropriate one of the helical swept wings in the vicinity of the locations 110A, 1108 or 110C of FIGS. 8A and 8B to permit deployment and retraction of either the spoiler 100, slat 15 or flap 90. While each helical swept wing has its own flap 90 and slat 15, the slat deploys/retracts on the leading edge and the flap deploys/retracts on the trailing edge (FIGS. 7A, 7B). There is a metallic strip 92 that extends across the gap formed when the flap 90 is in its deployed (extended) position) and generally follows the contour curvature of the helical swept wing. When the flap 90 is in its retracted position, the metallic strip 92 remains, but will be held in position against the helical swept wing by centrifugal forces during rotation of the helical swept wings.

A series of spoilers 100 are provided on each helical swept wing. Each spoiler 100 deploys outward in the manner of FIG. 7B, but only when the flap 90 is in its retracted position. When the flap 90 enters into its deployed position, the spoiler moves into its retracted position, which can be accommodated by a recess formed in the helical swept wing. Both the slat and flap deploy together and retract together, opposite to that of the state of deployment/retraction of the spoiler.

To assemble, the shaft 82 and the tang 83 of the coiled spring 84 is inserted into appropriate ones of the holes in the support plate 90. The multi-parallel grooved end portion 81 is fitted into the hole 74, which is grooved in a complementary manner.

The remaining hole 72 in the oval portion 71 of the eccentric cam 70 is aligned between the two aligned holes 64 of the pronged actuation bracket 60. A pin is inserted through the three holes and riveted at its outer portions to retain the hinge 70 and the actuation bracket 60 in pivot connection with each other.

The remaining hole 62 of the pronged actuation bracket 60 is fitted with a further pin that is secured to the element being deployed (e.g., spoiler, slat or flap).

Deterrents to Over-Speed (a) A centrifugal force deployed boundary layer spoiler 100 (over-speed deterrence) is with the helical swept wing 11 to serve as a span wise spoiler. The spoiler 100 extends above the boundary layer 12 along the leeward wing surface to provide an aerodynamic deterrent (speed brake) in over-speed situations. Under normal operating speeds the spoiler 100 is fully retracted via spring tension imparted by the spring loaded extendable hinge mechanism of FIG. 5. In over-speed situations the spoiler 100 is extended by centrifugal force deployed eccentric cams.

Figure 13A:
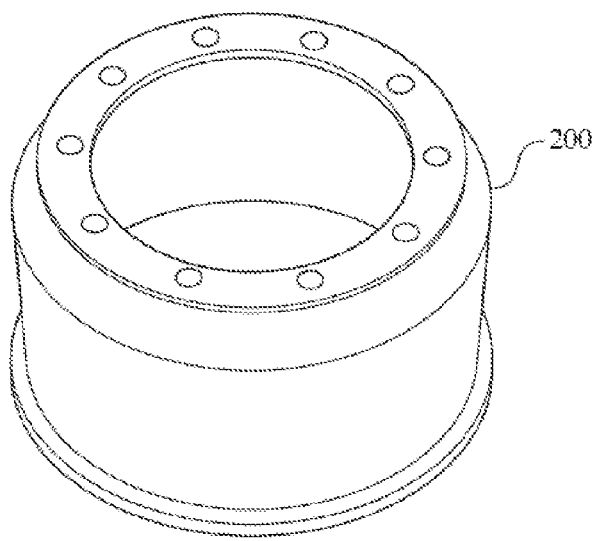
FIG. 13A is an isometric top view of a conventional fixed drum.
Figure 13B:
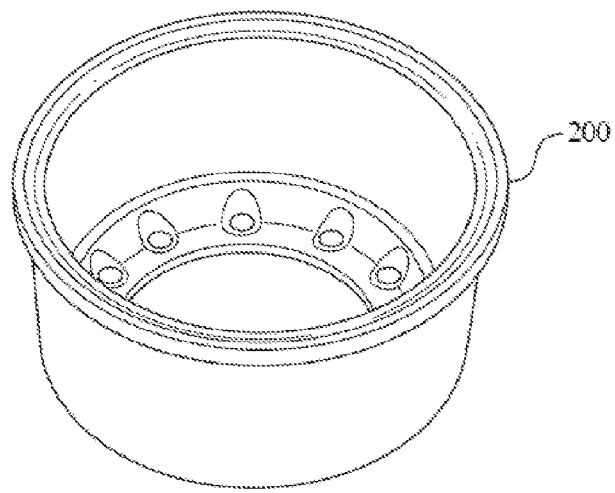
FIG. 13B is an isometric bottom view of a conventional fixed drum.

(b) Turning to FIG. 9, a brake assembly is depicted that includes a pair of centrifugal runaway brakes (over-speed deterrence) that enable rotary wing over-speed control by a pair of the centrifugally deployed brake shoes 138 that rotate with the main shaft and are housed within a fixed drum, such as the conventional drum 200 of FIGS. 13A, 13B. FIGS. 15A and B show a conventional fixed drum that may be used. Each brake shoe 138 has two friction surfaces. The centrifugal actuator mechanism is comprised of two centrifugal force activated bob-weights 132 that rotate twin eccentric cams 136, which increases the coefficient of friction between the rotating brake shoes 138 and the fixed drum as speed increases. The brake shoes 138 retract via springs at normal operating speeds and extend at a pre-programmed rate as revolutions per minute (RPM) induced centrifugal force is imparted on the bob-weights 132, in correspondence with the eccentric cams 136 and brake shoes 138. The ventilated backing plate 134 is complete with the brake shoes 138, actuator "S" eccentric cams 136 and centrifugal bob-weights 132. For purposes of illustration, there is is an uninstalled S cam 136 beside the brake assembly.

(c) The self ventilating centrifugal brake shoe backing plate 134 (over-speed deterrence) is provided as a spirally slotted plate. As a result, the centrifugally activated brake shoes are supported on this spirally slotted plate, which draws cold air from underneath, thus creating an accelerated airflow past the friction brake shoes that subsequently expel the heated air through the central orifice of the brake drum.

(d) the actuator assembly for the fail safe (backup to ECM controlled electro-mechanical valve) for over speed control. In the event that the wind turbine looses power (lightening strike etc.), the centrifugal force deployed actuator bob-weight would mechanically shut off flow to the high pressure hydraulic system that is integral to the transmission.

Figure 10:
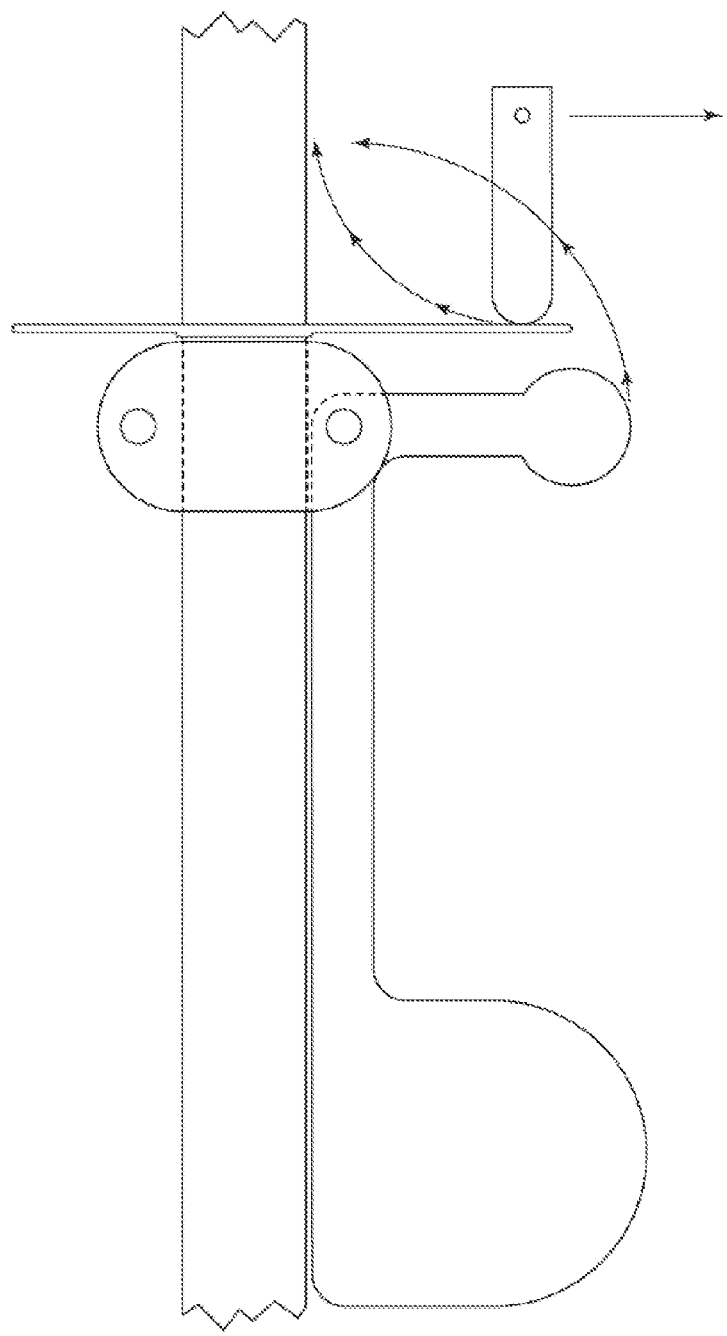
FIG. 10 is a schematic representation of actuator assembly for the fail safe (backup to ECM controlled electro-mechanical valve) for over speed control. In the event that the wind turbine looses power (lightening strike etc).

Turning to FIG. 10, the horizontal line near the top right is the hydraulic fluid direction of flow. The arc(s) represent the motion of the actuator arm and hydraulic shutoff (ball) valve arm swing. In over speed situations, the system pivots the bob-weight upward which rotates the actuator against a floating disc that rises to contact the hydraulic ball valve lever rotating it 90 degrees to shut off the flow of high pressure hydraulic fluid.

Electronic Control Module (ECM) and Related Components (i) The electronic control module (ECM) 60 (FIG. 4B) controls the engagement and disengagement of the alternator driveshaft sections in accordance with rotary wing torque and monitors electrical production, controls DC current to the AC inverter and processes accelerometer and vibration sensor data into electrical inputs to modulate the magneto-rheological fluid mount system.

(ii) An ECM input magnetically engaged conical dog clutch drive shaft along which is moved a narrow spaced tooth male spiraled conical dog clutch via an ECM activated magnet to engage a wide spaced tooth female spiraled conical dog clutch.

(iii) An ECM input magnetic clutch generator may be engaged or disengaged via a dedicated magnetic clutch by ECM inputs.

(iv) ECM controlled mounts—The torque moment and harmonic input generated through the rotary wing assembly and transmission gear shifts are monitored by vibration and velocity sensors placed through the structure that generate electrical inputs to the ECM that processes the data permitting it to continuously modify the flex modulus of the magneto-rheological fluid mounts.

(v) An ECM controlled 6-speed transmission with hydraulic speed control (over-speed deterrence) is clutch-less to control the alternator driveshaft speed. The ECM controlled 6-speed transmission is shifted via an ECM controlled shift servo. The transmission is constructed with an infinitely variable flow aperture restricted internal hydraulic pump to control operational wind gust generated over-speed situations via ECM inputs.

Alternators/Generators

Multiple alternators 50 (FIGS. 4B through 4D) or generators are integrated into the wind turbine, which generates electrical output at extremely low wind speeds, and the multiple alternators have a breakaway torque requirement of 20 inch pounds (in. lb). The alternators are arranged in a linear, vertical stack with a common driveshaft that is segregated by magnetic clutches that engage and disengage the alternators in response to electrical load and kinetic energy availability without the utilization of pulleys, idlers, pillow blocks, drive belts (such as those of U.S. Pat. No. 4,585,950) or inertial storage devices (such as US Patent Application Publication No. 2010/0270800), The alternators may be switched on in succession as available energy increases in response to faster helical swept wing rotation because of increasing wind speeds. Each alternator is conventional and described under one or more of the following U.S. Pat. Nos. 5,203,179; 5,284, 026; 5397975; 5502368; 6111768; 6703741, each of whose contents are incorporated herein by reference.

Power Takeoff, Thermal Control and Illuminated Sign (a) Power takeoff—the driveshaft is connected to a right angle drive that provides an external mechanical drive link, thus enabling the wind turbine to perform the mechanical functions of a windmill.

(b) Thermal control—heated air is forced to the top of the housing by individual fans that are affixed to the driveshaft below each alternator. A large diameter fan is affixed to the driveshaft above the transmission to expel the heated air from exhaust vents that populate the upper perimeter of the housing.

Figure 14:
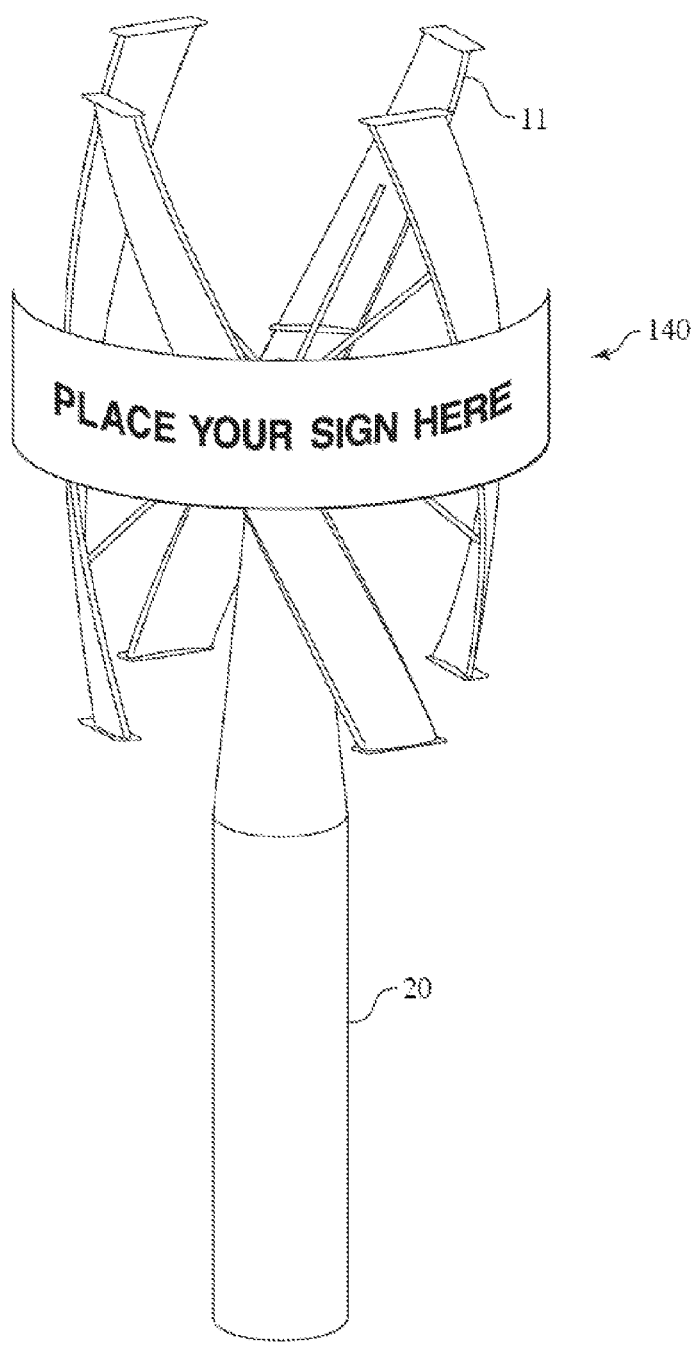
FIG. 14 is an isometric view of the vertical wind turbine of FIGS. 1 and 2 equipped with a programmable, illuminated sign.

(c) FIG. 14 shows a programmable 360 degree illuminated stationary sign 140 on a variable speed rotary device. Such arises as words or graphic logos from wings or blades that rotate at variable RPMs, such as found on wind mills, wind turbines and helicopters. The image is displayed by energizing and de-energizing lights that are laminated into an overlay that covers the visible rotating apparatus on the helical swept wings in either a horizontal or vertical plane. The input for the signage is controlled via EC that incorporates a logarithm to compensate for RPM variations based on sensor readings of changes in the velocity of the helical swept wings.

The programmable 360-degree illuminated stationary sign module, in response to inputs from sensors that detect changes in velocity of the helical swept wings over time, sends signals to direct the timing of illumination of the lights to compensate for fluctuations in the velocity of the helical swept wings over time due to variations in wind flow over time so that the desired pattern appears substantially the same over time even though the fluctuations in the velocity of the helical swept wings is present during the illumination of the lights.

Horizontal is Wind Turbine

Figure 11:
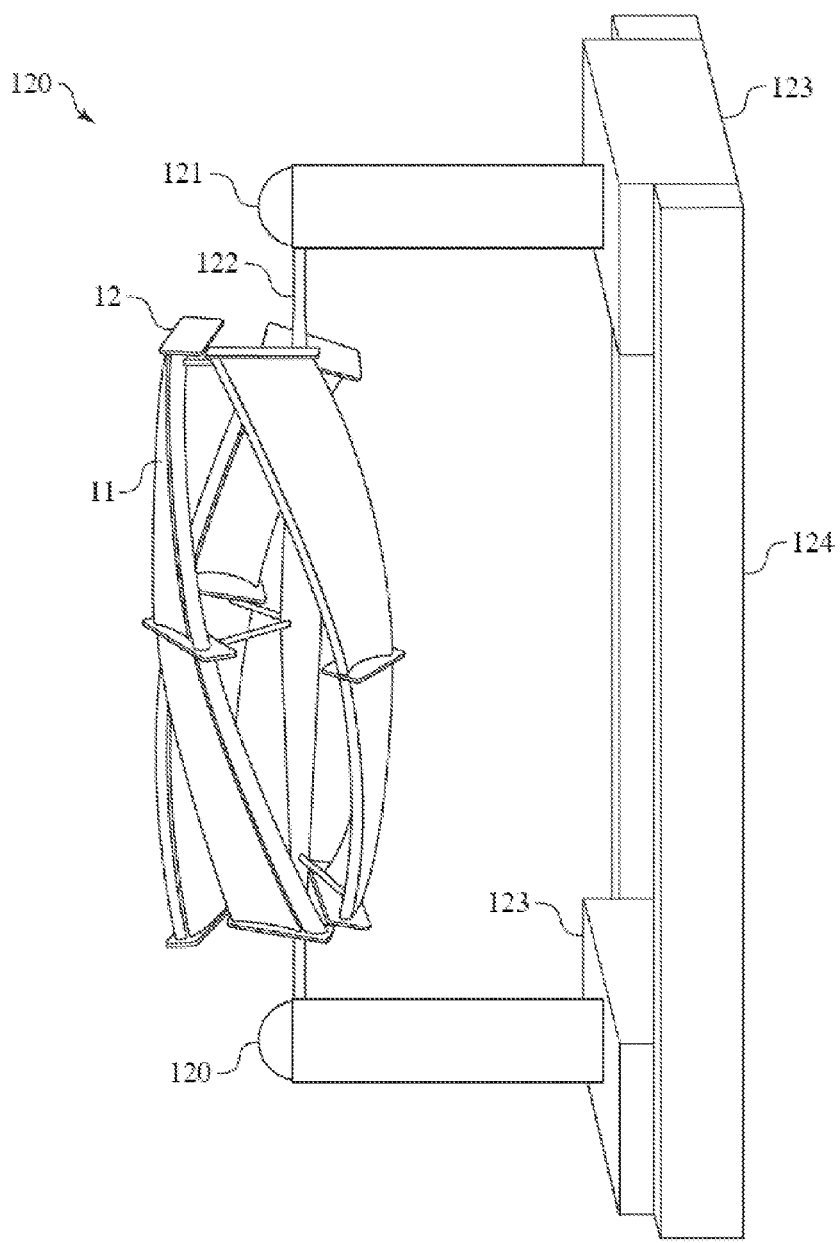
FIG. 11 is an isometric view of a self-contained horizontal axis wind turbine in a deployed position.
Figure 12:
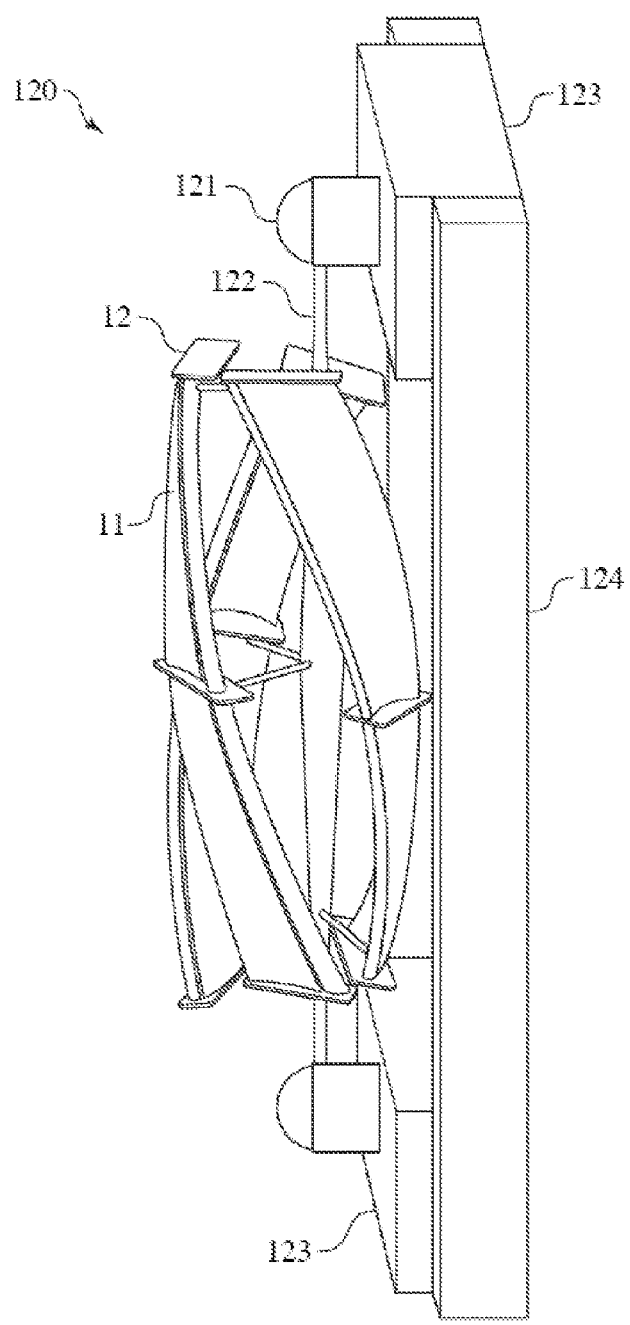
FIG. 12 is an isometric view of the self-contained horizontal axis wind turbine of FIG. 8 but in a stowed position, i.e., a collapsed or retracted condition.

FIGS. 11 and 12 show a collapsible horizontal axis wind turbine suited to supply renewable electricity to a forward operations base and a platform for autonomous robots to automatically recharge via permanently affixed charging pads. The supply of renewable electricity is from a wind turbine equipped with redundant generators, AC & DC distribution and electrical control systems, robot charging pads, hydraulic deployment and mechanical drive systems.

The collapsible horizontal axis wind turbine includes helical swept wings 11 that connect via rods at their centers to the central region of a shaft 122 that gradually widens away from its free ends to the center. Each of the helical swept wings 11 have boundary layers 12 at their opposite ends. The shaft 122 is supported on spaced apart collapsible cylindrical towers 20, 21, which in turn are supported by separate bases 123. The separate bases 123 are kept spaced apart by two parallel beams 124.

In operation, the helical swept wings 11 rotate in response to wind forces.

The collapsible horizontal axis wind turbine can be positioned, as best seen in FIG. 11 by comparing to that of FIG. 12, to operate at any one of a plurality of different heights by adjusting telescoping cylindrical towers 120, 121 according so that their overall height matches a desired variable height. The variable heights attainable are from 5.5 m to a fully extended maximum operating height of 10 m. The adjustable height is achieved via the telescoping cylindrical towers 120 that extend for operation via a redundant manual and or automatically activated hydraulic system.

For shipping transport purposes as best seen in FIG. 12, the wind turbine towers are retracted to a height of 2.3 m via the redundant manual and or automatically activated hydraulic system thus permitting its insertion into a standard 20' shipping container. The adjustable height telescoping cylindrical towers house 90° helical tooth spiral bevel gear speed multipliers that drive the automatically adjustable drive shafts and redundant generators. The standard 20 shipping container may be referred to as a sea-land container, which is of standard dimensions to both accommodate cargo and ease loading and unloading of transport into and out of vehicles/vessels/aircraft.

The wind turbine features two (2) autonomous/redundant generators that are mounted in at opposite ends of the chassis in weatherproof machinery enclosures. Rotational input for the independent generators is accomplished via variable length drive shafts that are housed in the variable height towers. Power conditioning and distribution hardware is housed in the weatherproof machinery enclosures. The wind turbine utilizes the same redundant manual and or automatically activated hydraulic system to extend and retract the locating ground stakes.

The leading edge slat helical wing horizontal axis wind turbine is supported on variable height cylindrical towers that extend for operation and retract for transport via a redundant manual and or automatically activated hydraulic system.

The wind turbine and underlying pneumatic tire suspension retracts enabling the entire apparatus to package into a standard 20' shipping container. For the standard 20 shipping container, ingress and egress is facilitated by extending suspension via a redundant hydraulic jack system to lift the chassis from the container floor. The insertion and removal of the wind turbine from the standard shipping container is facilitated via a manually operated reversible winch. The wind turbine is housed within a fully mobile chassis that is equipped a redundant hydraulic system that fully extends the pneumatic tire suspension with brakes on each axe to provide off-road capable chassis ground clearance. The same hydraulic system retracts the suspension at the operating site and extends the groundstakes. The wind turbine is transported to and from the theater of operation via a standard Hunvee pintle hook connection. The wind turbine is suitable for helicopter transport due to its light weight.

While the foregoing description and drawings represent the preferred embodiments of the present invention, it will be understood that various changes and modifications may be made without departing from the scope of the present invention.

What is claimed is:

1. A wind turbine, comprising:
a frame structure;
a housing enclosing said frame structure;
a rotary, wing assembly supported by said frame structure, said rotary wing assembly including rotating eccentric cams and including asymmetric, helical swept wings that rotate to capture wind throughout a circumference of the rotary wing assembly from both windward and leeward sides so that a torque input spreads evenly to mitigate damaging harmonic pulsations that would otherwise arise without the torque input spreading evenly;
permanent magnet disc means for levitating static weight of an entirety of the rotary wing assembly via magnetic repulsion, said permanent magnet disc means including double opposing conical needle bearings with a toothed ring that all together provide a hall effect and including an electronic inductive pickup that senses velocity, the double opposing needle bearings including two opposing needle bearings, each of the two opposing needle bearings being configured to converge in a conical manner toward the toothed ring that is at a location between the two opposing needle bearings; and
hub means for affixing said permanent magnet disc means within said frame structure in a manner that counteracts both a coefficient of friction ("COF") associated with rotation of the rotary wing assembly and ensuing bearing wear imparted from the rotary wing assembly and offsets momentary loads from wind gusts; and
electricity generating means within said housing for generating electricity in response to rotation of the helical swept wings.

2. A wind turbine, comprising:
a frame structure;
a housing enclosing said frame structure;
a rotary wing assembly supported by said frame structure, said rotary wing assembly including rotating eccentric cams and including asymmetric, helical swept wings that rotate to capture wind throughout a circumference of the rotary wing assembly from both windward and leeward sides so that a torque input spreads evenly to mitigate damaging harmonic pulsations that would otherwise arise without the torque input spreading evenly;
permanent magnet disc means for levitating static weight of an entirety of the rotary wing assembly via magnetic repulsion;
hub means for affixing said permanent magnet disc means within said frame structure in a manner that counteracts both a coefficient of friction ("COF") associated with rotation of the rotary wing assembly and ensuing bearing wear imparted from the rotary wing assembly and offsets momentary loads from wind gusts;
electricity generating means within said housing for generating electricity in response to rotation of the helical swept wings;
a leading edge slat connected to a leading edge side of said helical swept wings in a manner that enables the leading edge slat to move between deployed and retracted positions;
a trailing edge flap connected to a trailing edge side of said helical swept wings in a manner that enables the trailing edge flap to move between deployed and retracted positions;
responsive means responsive to a bias force imparted from a spring-loaded extendable hinge mechanism for moving the leading edge slat into the deployed position of the leading edge slat from the retracted position of the leading edge slat so that in the leading edge deployed position, the leading edge slat increases a camber of said helical swept wings and an angle of attack beyond that for the retracted position of the leading edge slat, said responsive means being responsive to a rotation induced centrifugal force imparted on rotating eccentric cams overcoming the bias force from the spring-loaded extendable hinge for moving the leading edge slat into the retracted position of the leading edge slat from the extended position of the leading edge slat;
further responsive means responsive to a bias force imparted from a further spring-loaded extendable hinge mechanism for moving the trailing edge flap into the deployed position of the trailing edge flap from the retracted position of the trailing edge flap so that in the deployed position of the trailing edge flap, the trailing edge flap increases a camber of said helical swept wings and an angle of attack beyond that for the retracted position of the trailing edge flap, said further responsive means being responsive to a rotation induced centrifugal force imparted on further rotating eccentric cams overcoming the bias force from the further spring-loaded extendable hinge for moving the trailing edge flap into the retracted position of the trailing edge flap from the extended position of the trailing edge flap.

3. The wind turbine of claim 2, further comprising
a boundary layer spoiler movable between retracted and deployed positions of the boundary layer spoiler; and
means for providing an aerodynamic deterrent in overspeed situations by moving the boundary layer spoiler into the deployed position of the boundary layer spoiler in response to a rotation induced centrifugal force imparted on additional rotating eccentric cams overcoming an additional bias force imparted by an additional spring-loaded extendable hinge mechanism and by moving the boundary layer spoiler into the retracted position in response to the additional bias force imparted by the additional spring-loaded extendable hinge mechanism.

4. A wind turbine, comprising:

a frame structure;

a housing enclosing said frame structure;

a rotary wing assembly supported by said frame structure, said rotary wing assembly including rotating eccentric cams and including asymmetric, helical swept wings that rotate to capture wind throughout a circumference of the rotary wing assembly from both windward and leeward sides so that a torque input spreads evenly to mitigate damaging harmonic pulsations that would otherwise arise without the torque input spreading evenly;

permanent magnet disc means for levitating static weight of an entirety of the rotary wing assembly via magnetic repulsion; and hub means for affixing said permanent magnet disc means within said frame structure in a manner that counteracts both a coefficient of friction ("COF") associated with rotation of the rotary wing assembly and ensuing bearing wear imparted from the rotary wing assembly and offsets momentary loads from wind gusts;

electricity generating means within said housing for generating electricity in response to rotation of the helical swept wings;

a plurality of alternators engagable and disengageable with a common alternator driveshaft;

electronic control module (ECM) means for directing engagement and disengagement of the plurality of alternators from the common alternator driveshaft in accordance with rotary wing torque and for monitoring electrical production and for modulating direct current to an alternating current inverter and for converting accelerometer and vibration sensor inputs to modulate a magneto-rheological fluid mount; and a multi-speed transmission responsive to said ECM means for driving said common alternator driveshaft at appropriate speeds under hydraulic speed control, the multi-speed transmission being constructed with a variable flow aperture restricted hydraulic pump that controls operational wind gust generated over-speed situations via inputs from the ECM means.

5. A wind turbine, comprising:

a frame structure;

a housing enclosing said frame structure;

a rotary wing assembly supported by said frame structure, said rotary wing assembly including rotating eccentric cams and including asymmetric, helical swept wings that rotate to capture wind throughout a circumference of the rotary wing assembly from both windward and leeward sides so that a torque input spreads evenly to mitigate damaging harmonic pulsations that would otherwise arise without the torque input spreading evenly;

permanent magnet disc means for levitating static weight of an entirety of the rotary wing assembly via magnetic repulsion;

hub means for affixing said permanent magnet disc means within said frame structure in a manner that counteracts both a coefficient of friction ("COF") associated with rotation of the rotary wing assembly and ensuing bearing wear imparted from the rotary wing assembly and offsets momentary loads from wind gusts;

electricity generating means within said housing for generating electricity in response to rotation of the helical swept wings;

a plurality of alternators engagable and disengageable with a common alternator driveshaft;

electronic control module (ECM) means for directing engagement and disengagement of the plurality of alternators from the common alternator driveshaft in accordance with rotary wing torque and for monitoring electrical production and for modulating direct current to an alternating current inverter and for converting accelerometer and vibration sensor inputs to modulate a magneto-rheological fluid mount; and a magnetically engaged conical dog clutch drive shaft responsive to inputs from said ECM means to effect engagement and disengagement of the common alternator driveshaft.

6. A wind turbine, comprising:

a frame structure;

a housing enclosing said frame structure;

a rotary wing assembly supported by said frame structure, said rotary wing assembly including rotating eccentric cams and including asymmetric, helical swept wings that rotate to capture wind throughout a circumference of the rotary wing assembly from both windward and leeward sides so that a torque input spreads evenly to mitigate damaging harmonic pulsations that would otherwise arise without the torque input spreading evenly;

permanent magnet disc means for levitating static weight of an entirety of the rotary wing assembly via magnetic repulsion;

hub means for affixing said permanent magnet disc means within said frame structure in a manner that counteracts both a coefficient of friction ("COF") associated with rotation of the rotary wing assembly and ensuing bearing wear imparted from the rotary wing assembly and offsets momentary loads from wind gusts;

electricity generating means within said housing for generating electricity in response to rotation of the helical swept wings;

lights on the helical swept wings;

a programmable 360-degree illuminated stationary sign module; and a variable speed rotary device configured to direct illumination of the lights to form a desired pattern, said programmable 360-degree illuminated stationary sign module, in response to inputs from sensors that detect changes in velocity of the helical swept wings over time, sending signals to direct the timing of illumination of the lights to compensate for fluctuations in the velocity of the helical swept wings over time due to variations in wind flow over time so that the desired pattern appears substantially the same over time even though the fluctuations in the velocity of the helical swept wings is present during the illumination of the lights.

7. A wind turbine, comprising:

a frame structure;

a housing enclosing said frame structure;

a rotary wing assembly supported by said frame structure, said rotary wing assembly including rotating eccentric cams and including asymmetric, helical swept wings that rotate to capture wind throughout a circumference of the rotary wing assembly from both windward and leeward sides so that a torque input spreads evenly to mitigate damaging harmonic pulsations that would otherwise arise without the torque input spreading evenly;

permanent magnet disc means for levitating static weight of an entirety of the rotary wing assembly via magnetic repulsion;

hub means for affixing said permanent magnet disc means within said frame structure in a manner that counteracts both a coefficient of friction ("COF") associated with rotation of the rotary wing assembly and ensuing bearing wear imparted from the rotary wing assembly and offsets momentary loads from wind gusts;

electricity generating means within said housing for generating electricity in response to rotation of the helical swept wings;

fan means for forcing heated air to a top of the housing by individual fans that are affixed to the driveshaft below each alternator; and a further fan affixed to the common alternator driveshaft above the transmission to expel the heated air from exhaust vents that populate an upper perimeter of the housing.

8. A wind turbine, comprising:

a frame structure;

a housing enclosing said frame structure;

a rotary wing assembly supported by said frame structure, said rotary wing assembly including rotating eccentric cams and including asymmetric, helical swept wings that rotate to capture wind throughout a circumference of the rotary wing assembly from both windward and leeward sides so that a torque input spreads evenly to mitigate damaging harmonic pulsations that would otherwise arise without the torque input spreading evenly;

permanent magnet disc means for levitating static weight of an entirety of the rotary wing assembly via magnetic repulsion;

hub means for affixing said permanent magnet disc means within said frame structure in a manner that counteracts both a coefficient of friction ("COF") associated with rotation of the rotary wing assembly and ensuing bearing wear imparted from the rotary wing assembly and offsets momentary loads from wind gusts;

electricity generating means within said housing for generating electricity in response to rotation of the helical swept wings;

two telescoping towers, the housing extending between the two telescoping towers and being supported by the two telescoping towers; and means for making an adjustment in a variable height reached by the two telescoping towers as the two telescoping towers extend in a telescoping manner.

9. The wind turbine of claim 8, further comprising autonomous, redundant independent generators mounted at opposite ends of a chassis in weatherproof machinery enclosures, means for accomplishing rotational input for the autonomous, redundant independent generators via variable length drive shafts that are housed in the telescoping towers, power conditioning and distribution hardware being housed in the weatherproof machinery enclosures.

10. The wind turbine of claim 8, wherein the leading edge slat of the helical swept wings is supported on the telescoping towers.

11. A wind turbine, comprising:

a frame structure;

a housing enclosing said frame structure;

a rotary wing assembly supported by said frame structure, said rotary wing assembly including rotating eccentric cams and including asymmetric, helical swept wings that rotate to capture wind throughout a circumference of the rotary wing assembly from both windward and leeward sides so that a torque input spreads evenly to mitigate damaging harmonic pulsations that would otherwise arise without the torque input spreading evenly;

permanent magnet disc means for levitating static weight of an entirety of the rotary wing assembly via magnetic repulsion;

hub means for affixing said permanent magnet disc means within said frame structure in a manner that counteracts both a coefficient of friction ("COF") associated with rotation of the rotary wing assembly and ensuing bearing wear imparted from the rotary wing assembly and offsets momentary loads from wind gusts; and electricity generating means within said housing for generating electricity in response to rotation of the helical swept wings, said electricity generator means including a plurality of alternators arranged in a stack;

one axial fan beneath each of the alternators within the frame structure to propel airflow through and past the alternators; and one radial fan at higher elevation than the axial fans.

12. The wind turbine of claim 11, further comprising runaway brakes having brake shoes that rotate with a main shaft of the helical wings, the radial fan being at an elevation above the runaway brakes, the axial fans being at elevations below the runaway brakes.

13. A wind turbine, comprising:

a frame structure;

a housing enclosing said frame structure;

a rotary wing assembly supported by said frame structure, said rotary wing assembly including rotating eccentric cams and including asymmetric, helical swept wings that rotate to capture wind throughout a circumference of the rotary, wing assembly from both windward and leeward sides so that a torque input spreads evenly to mitigate damaging harmonic pulsations that would otherwise arise without the torque input spreading evenly;

permanent magnet disc means for levitating static weight of an entirety of the rotary wing assembly via magnetic repulsion;

hub means for affixing said permanent magnet disc means within said frame structure in a manner that counteracts both a coefficient of friction ("COF") associated with rotation of the rotary wing assembly and ensuing bearing wear imparted from the rotary, wing assembly and offsets momentary loads from wind gusts;

electricity generating means within said housing for generating electricity in response to rotation of the helical swept wings;

at least one component movable between deployed and retracted positions; and responsive means responsive to a bias force imparted from a spring-loaded, extendable, hinge mechanism for moving the at least one component into the deployed position from the retracted position and responsive to a rotation induced centrifugal force imparted on the rotating eccentric cams overcoming the bias force imparted from the spring-loaded, extendable, hinge mechanism for moving the at least one component into the retraced position.

14. The wind turbine of claim 13, further comprising runaway brakes having brake shoes that rotate with a main shaft of the helical wings;

means for deploying the brake shoes to engage the main shaft under friction by moving the brake shoes from a non-engaging position clear of the main shaft to an engaging position that engages the main shaft to impart the friction; and a self ventilating centrifugal brake shoe backing plate that supports said brake shoes and draws air through to create airflow that passes the brake shoes to expel through heated air through an orifice of a brake drum of the runaway brakes.

15. The wind turbine of claim 13, wherein said electricity generator means includes a plurality of alternators arranged in a stack with a common alternator driveshaft that is segregated by magnetic clutches that engage and disengage the alternators in response to electrical load and kinetic energy availability without utilization of pulleys, idlers, pillow blocks, or drive belts.

16. The wind turbine of claim 13, further comprising
a plurality of alternators engagable and disengageable with a common alternator driveshaft; and
electronic control module (ECM) means for directing engagement and disengagement of the plurality of alternators from the common alternator driveshaft in accordance with rotary wing torque and for monitoring electrical production and for modulating direct current to an alternating current inverter and for converting accelerometer and vibration sensor inputs to modulate a magneto-rheological fluid mount.

17. The wind turbine of claim 16, further comprising
a magnetically engaged clutch generator responsive to inputs from said ECM means to effect engagement with said alternators.

18. The wind turbine of claim 13, wherein the frame structure is self-supporting without guy wires.

19. The wind turbine of claim 13, wherein the at least one component is a leading edge slat connected to a leading edge side of said helical swept wings in a manner that enables the leading edge slat to move between the deployed and retracted positions, said leading edge slat in the deployed position causing an increase in a camber of said helical swept wings and an angle of attack beyond that in the retracted position.

20. The wind turbine of claim 13, wherein the at least one component is a trailing edge flap connected to a trailing edge side of said helical swept wings in a manner that enables the trailing edge flap to move between the deployed and retracted positions, said trailing edge flap in the deployed position causing an increase in a camber of said helical swept wings and an angle of attack beyond that in the retracted position.

21. The wind turbine of claim 13, further comprising a boundary layer spoiler movable between extended and retracted positions; and
means responsive to an additional bias force from an additional spring-loaded extendable hinge mechanism for moving the boundary layer spoiler into a retracted position of the boundary layer spoiler and responsive to the rotation induced centrifugal force imparted on additional rotating eccentric cams overcoming the additional bias force for moving the boundary layer spoiler into the deployed position of the boundary layer spoiler.

* * * * *